Patented June 11, 1946

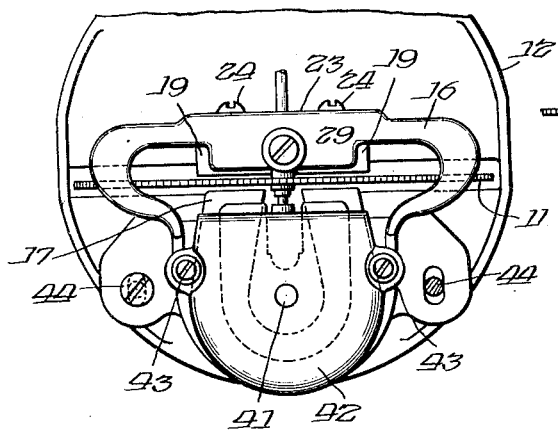
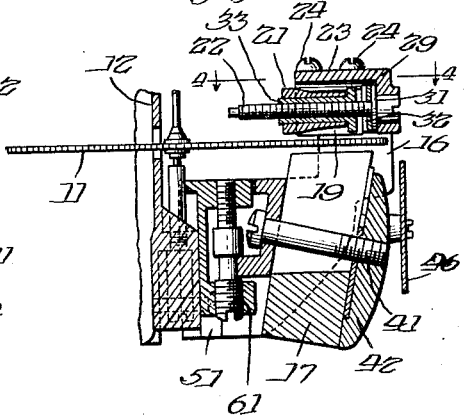
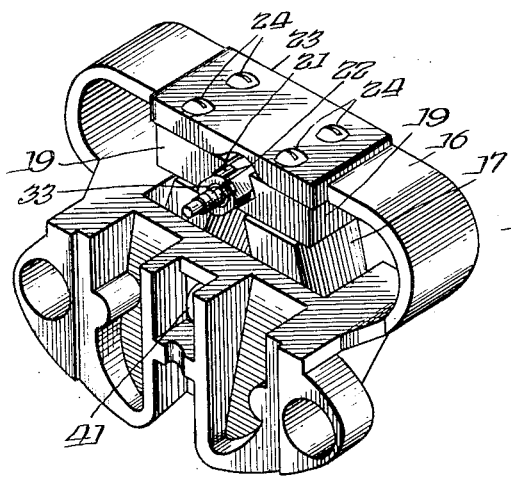
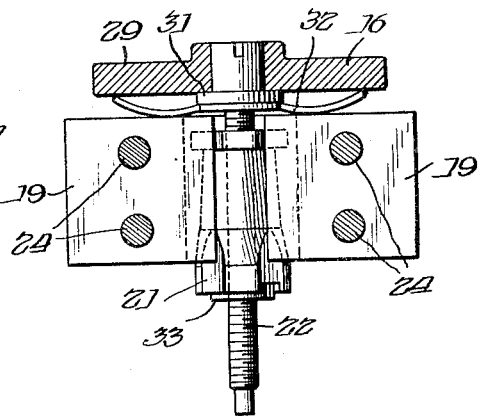
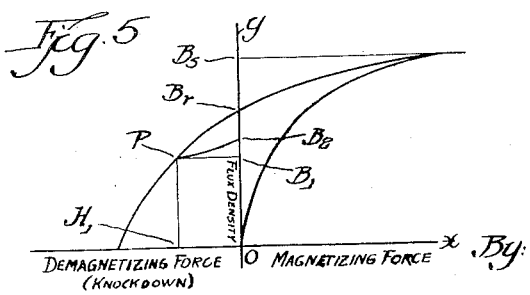

2,401,730

UNITED STATES PATENT OFFICE 2,401,730

STABILIZATION OF METER DAMPING UNITS

Stanley S. Green, La Fayette, Ind., assignor to Duncan Electric Manufacturing Company, La Fayette, Ind., a corporation of Illinois Application August 4, 1940, Serial No. 351,285

12 Claims. (Cl. 171—34)

In watt-hour meters, one of the chief problems is to maintain accuracy over a period of years. In each meter the disc is driven by electromagnets connected to the circuit being measured and is retarded to the proper speed by one or more permanent magnets arranged to provide a gap through which the disc rotates. In any given magnet system the retarding effect of the magnet is proportional to the amount of magnetic flux which the magnet is able to force across the gap. Accordingly, if the magnet weakens in the course of time, the retarding force will be decreased and the meter will run faster than it should and indicate that more electricity or energy has been used than has in fact been used. Likewise, if the length of the magnetic gap should change, the amount of magnetic flux which the same magnet was able to force across this gap would vary, with the result that in this case also the meter would become inaccurate.

Of course, it has long been recognized that permanency of the magnets was necessary to permanent accuracy of the meters, and considerable care has been exercised in endeavoring to remove the major sources of magnet weakening. Magnets have not only been knocked down or partially demagnetized electrically after they have been magnetized, but they have also been heat-treated.

Stabilization of the magnet can occur either in service or it can be effected during the course of manufacture. If it is allowed to occur in service as a result of the passage of a great length of time or of temperature cycles or of long-maintained high temperature, it is obvious that accuracy is forfeited. If it is made to occur at the factory before calibration as a result of a quick stabilizing process of some kind, as by a heat treatment, this objection is removed. When stabilizing processes on magnets are mentioned it is this treatment during manufacture which is meant.

One form of treatment that has been recommended is steaming for about 12 hours, preferably with alternate heating and cooling. It has been stated that it makes little difference whether the magnet is magnetized before or after this temperature-maturing process. (Spooner, "Properties and Testing of Magnetic Materials," first edition, page 74.)

In my paper before the American Institute of Electrical Engineers in January 1939, (printed in vol. 58 of the "Transactions" in appendix II, paragraph 2) I specified more exactly than Spooner, one full routine of treatments for a high grade chrome magnet of the prior art, including baking, after knockdown, at 105° C. for four to six hours.

According to one aspect of the present invention, the magnets are treated after magnetization and knockdown with a heat-treatment incomparably more severe than that used heretofore, a temperature of 450° F. at present being preferred. This treatment is successful without repeated heating and cooling and renders the magnets substantially stabilized or immune to all temperature cycles or sustained temperatures encountered in meter practice. It may be noted that in some instances in actual service meters are subject to very severe temperature cycles. In some southern climates, for example, they are exposed to the sun outdoors or located in extremely hot sun-baked warehouses or the like. It has been determined, however, that magnets treated in accordance with this invention are stabilized as to any temperature conditions or cycles below 100° C. or even higher.

The recent improvement in watt-hour meters taught by my Patent No. 2,110,418, involving the introduction of a new magnet metal called "Alnico," having high coercive strength, has set new standards of continued meter accuracy. Alnico is so resistant to effects which have formerly weakened other magnets that the relatively small changes due to stabilization are substantially the only remaining source of error and furthermore, even these changes are much less than corresponding changes with older meter magnets. In prior meters such changes were large by contrast with the Alnico and were attributable to a number of causes, among them being changes in the internal strains, and temper of the materials.

Although it was possible in some cases to make former magnets reasonably acceptable by heat treatments, I have discovered that even the most sever treatments which were given to former magnets are woefully inadequate for removing the last small source of error from Alnico magnets.

Continued permanency of the meters having Alnico magnet units is further assured by heat-treating the aluminum which supports the two parts of the magnet system and hence determines the length of the magnetic gap. Without such heat-treatment aluminum lengthens about .0008 inch per inch during complete aging caused by the application of heat or possibly by the passage of a long period of time. Although this is a small amount, any lengthening of the gap, no matter how small, is enough to affect the accuracy of the meter. It has been found most satisfactory to assemble the magnetic units and heat-treat the whole assembly. In this way variations in the accuracy of the meters due to the aging effect of sustained high temperatures or temperature cycles are completely avoided.

Additional objects and advantages of the invention will be apparent from the following description and from the drawing, in which:

Fig. 1 is a fragmentary front elevation of a meter including a magnet embodying, and treated by the methods of the present invention.

Fig. 2 is a fragmentary central vertical section of Fig. 1.

Fig. 3 is a perspective view illustrating the magnet unit removed from the structure of Figs. 1 and 2.

Fig. 4 is a fragmentary view taken approximately on the line 4—4 of Fig. 2.

Fig. 5 shows curves used in explaining the invention.

A preferred form of the invention has been chosen for illustration and description, in compliance with Section 4888 of the Revised Statutes, but persons skilled in the art will readily perceive other means for accomplishing the same results, and the claims are therefore to be construed as broadly as possible, consistent with the prior art.

Except as to features relating to the heat-treatment, the meter chosen for illustration may be the same as that illustrated in my copending application Serial No. 241,592, filed November 21, 1938. The disclosures of that application are hereby made a part of the present application by reference.

Although the present invention relates mainly to heat-treating, it may be helpful to describe the illustrated structure briefly. Probably everyone has observed the rotation of the disc of the ordinary watt-hour meter with which nearly all are familiar, as the electric meter used in homes. In the drawing this disc is designated by the numeral 11. The disc is rotatably carried by a frame 12 and drives a register, not shown, for indicating the amount of energy or watt hours consumed. The disc is driven by electro-magnets, not shown, which are connected to the circuit being measured. It rotates with extremely little friction and hence would spin around at a very fast rate if no retarding or damping means were provided to slow it down to a speed proportional to power consumption. It is common practice to provide a damping unit consisting of one or more permanent magnets with the disc rotating through a gap in the magnetic circuit. In the illustrated form of the invention the damping unit includes the auxiliary frame 16, the magnet 17 secured thereto, and the armature formed of two separate plugs 19 and an adjustable plug 21 between them. The plug 21 is moved by a screw 22 and moves forwardly or rearwardly of the meter, or, as seen in Fig. 2, to the right or left. The plugs 19 are secured to the upper portion 23 of the auxiliary frame 16 by screws 24. The screw 22 is journaled in a flange 29 forming an integral part of the upper frame portion 23. The screw has a flange 31 integrally formed at the base of its head which bears against the inside of the flange 29. A leaf spring 32 has its ends bearing against the plugs 19 and its central portion urging the flange 31 against the flange 29 so as to remove all longitudinal play from the mounting of the screw. The screw 22 screws into a sleeve 33 by which the plug 21 is carried.

The magnet 17 is secured to the frame 16 by means of a screw 41, which screws into a cast nut 42, which incidentally has formed thereon lugs 43 for supporting the name plate 46. The auxiliary frame 16, which for convenience may be called a clamp, is secured to a bracket 51 by means of screws 44, which preferably pass through slots in the clamp 16 so that the clamp 16 will be vertically adjustable. The vertical adjustment is made by means of a screw 61 in a manner fully described in my copending application Serial No. 241,592.

*Classes of flux changes in magnets*

Various types of temperature effects on the braking magnets have been known heretofore. There is a reversible change, which may be designated as a Class I effect, which causes no permanent weakening of a magnet, the strength dropping as the temperature rises but the full strength returning as the temperature drops to its original value. For this effect a compensator 60 is provided. Such temperature compensators are well known in the art and are not the subject of the present invention. It is sufficient to state that, as the temperature rises and drops, they adequately compensate for the reversible change which takes place.

The remaining temperature effects which are discussed involve a change in the flux of the braking magnet which is permanent and non-reversible in character. Although they are discussed as temperature effects, it should be borne in mind that there is reason to believe that some of the same effects would be consummated with the passage of sufficiently long periods of time, even at normal temperatures or at only slightly elevated temperatures. Indeed, in stabilization work with magnets, the application of an elevated temperature may simulate closely an acceleration of the passage of time. As an example, it might be assumed that under certain conditions the passage of 100 hours at 100° C. simulates the passage of 10 years at 25° C.

Another change which may be induced as a result of temperature that has been recognized heretofore and which may be designated as a Class II effect, is the result of temperature on internal strains and temper, in which there is a change in the state of the metal comprising the magnet which has an undesirable incidental magnetic effect, in that the ability of the magnet to retain its initial given amount of magnetism is impaired. Such a change is irreversible. The present invention is not greatly concerned with this effect inasmuch as it presents problems which are pertinent almost entirely to only the chrome magnets of the prior art. In Alnico magnets, with which this invention is especially concerned, there are no appreciable effects of this type to contend with after the original heat-treatment given in manufacture. The substance of this paragraph was pointed out and discussed in greater detail in my previously mentioned "American Institute of Electrical Engineers" paper under the heading "Effect of baking," which also gives a preferred manufacturer's heat-treatment for eliminating the Class II effect. The entire disclosure of that paper is hereby made a part of this application by reference.

A third change comprising a permanent or irreversible flux loss in a magnet as a result of raising it to any given temperature after it has been magnetized may be designated as a Class III effect. This effect is always in the direction of a flux decrease. This effect occurs merely as a result of attaining a given temperature for a short time and also is of little significance to the present invention since it is so small for Alnico, especially in the range up to 100° C., which is higher than any temperature encountered in actual service in a meter. Even as a result of heating an Alnico magnet up to 450° F. (268° C.) this Class III effect is so small as to be detected with the greatest of difficulty. This is to be expected in that it is necessary to heat Alnico to approximately 775° C. to permanently rid it of all its magnetism by heat and even at 700° C. it retains well over half of the original flux.

A fourth change appears to be caused chiefly by purely magnetic factors and may be designated as a Class IV effect. As indicative of the difference between this effect and the others it is noted that, although irreversible, this effect can be in the direction of a flux increase even though it is usually in the direction of a weakening of the flux. In order to complete itself, this change takes time and this time can be decreased by holding the magnet at a high temperature or by giving the magnet temperature cycles. For the reason that this Class IV effect can be brought to completion sooner by subjecting the magnet to heat, it would be easy to confuse it with Class III effects if it were not for the fact that many tests clearly show that the Class IV effects are very little or no greater if completed at say 268° C. than at 100° C. Of course, there is a little difference in total change but it apparently represents the Class III effect and this effect is small as compared with the Class IV effect.

Elimination of Class IV effects are the primary concern of this invention as, from the definitions and discussions just given, it can be seen that Class I, Class II and Class III effects are of little moment. In the case of some varieties of conventional chrome magnets, it has been observed that in some instances a prolonged heating of the magnets at 212° F. will increase the speed of the meter by as much as 17%. This change, of course, is the summation of effects II, III and IV for chrome magnets, although it is interesting to note that these results were observed on modern meters which presumably should have already received treatment to take care of most of the changes due to reduction in strains and change in temper representing the Class II effect. It is interesting to note that for Alnico magnets as described in this application, but not prestabilized in accordance herewith, no change in excess of approximately 3% in meter registration has ever been observed as a result of such prolonged baking at 212° F. Nevertheless, the elimination of the possibility of even these small errors in the case of some magnets is desirable and is the subject-matter of this invention.

Although complete disclosure of a correct theory is not required or essential in practicing my invention, a discussion of Class IV effects with reference to Figure 5 is helpful. In the following discussion it will be assumed for simplicity that for Alnico the Class II and Class III effects are substantially negligible. This figure represents portions of the hysteresis loop of an Alnico magnet. The figure does not assume the presence of an air gap in the magnetic circuit but the presence or absence of such a gap does not affect the general conclusions which this discussion is intended to illustrate. Assume the application of a strong magnetizing force in a positive direction along the OX axis to bring the unmagnetized material to a condition approaching saturation with a flux of $Bs$. Now remove all of the magnetizing force and the value of the flux will immediately decrease to $Br$ on the OY axis. Given a large amount of time or the application of some time and a high temperature, however, and the flux value will decrease still further to a value $Br'$ (not shown on the figure but very close to $Br$). The difference between $Br'$ and $Br$ is Class IV effect and under the conditions outlined is known to be larger than for any other known choice of conditions and is in the direction of a flux decrease. Many tests have shown this.

Now assume that a demagnetizing force produced by a direct current in a value represented by the line $OH_1$ be applied to the magnet. The flux in the circuit will be brought down to a value $B_1$. If this demagnetizing force is now removed the flux will increase along the path of a partial displaced hysteresis loop $PB_2$ to a value $B_2$. This happens immediately but again if time or time and heating is allowed to come into play, the flux will increase to a new value $B_2'$ which is slightly larger than $B_2$. Again the difference between $B_2'$ and $B_2$ is Class IV change but in this case it represents a flux increase.

It should be noted that when the flux was on the decrease just previous to the starting of the stabilization process the Class IV stabilization change was in the negative direction (that is in the direction of a further decrease in flux upon completion of the stabilization change). When the flux was on the increase just previous to the starting of the stabilization process the Class IV stabilization change was in the positive direction (or in a direction of a further small flux increase).

The discussion so far in the case of Figure 5 is only for the two extreme cases of no knockdown and a direct current knockdown. Tests show that in the case of no knockdown the largest possible stabilization error (Class IV) is produced and in the case of a direct current knockdown a Class IV stabilization error is produced, which although considerably smaller, is nevertheless in the opposite direction. The usual and most convenient applied form of knockdown which has been given magnets in the past has been alternating current knockdown, in which the effective alternating knockdown force is increased to a maximum and then gradually reduced to zero or to a very small value. Tests on many magnets, oft repeated, have shown that the Class IV stabilization error in this case is predominately in the direction of a flux decrease. In fact flux increases are a rarity and if found at all are exceedingly small in magnitude as compared with the flux decreases. The reason for this effect with the alternating m. m. f. is a matter for conjecture. Although many tests prove it, it is not necessary to explain it.

The knockdown of the magnet is very important. A magnet in use is subjected to stray magnetic fields, some of which, as in the case of currents produced by lightning, are quite intense. If the magnet is snubjected to a knockdown force of a given strength, called coercive strength, it is immune to weakening by any other magnetic knockdown force of equal or smaller coercive strength. One of the advantages of Alnico is that its magnetic qualities are such that it may stand a much stronger knockdown force than prior conventional magnets, as described in my prior Patent No. 2,110,418, the disclosure of which is hereby made a part of this application by reference.

The conventional methods of knockdown use alternating currents but these methods, as mentioned before, leave the magnet slightly stronger than its stabilized strength.

After a magnet has been highly magnetized by a strong coercive magnetizing force, its tendency to drop to stability apparently becomes weaker as stability is approached. It is probable that when the magnet gets close to stabilization its rate of change drops almost to zero and it might therefore take years for it to reach stabilization unless its unstable molecules are liberated as by heat. It seems probable that when the magnetizing force is removed, the magnet approaches stabilization from the positive or magnetized direction and hence further stabilization would weaken it. Tests seem to show that an alternating current knockdown does not stabilize the magnet and will even unstabilize it if it has been stabilized. It will of course be recognized that the correctness of these theories are not important to the present invention. The beneficial results of my invention have been thoroughly proved by numerous prolonged tests. Tests have also shown that the alternating current knockdown can have an unstabilizing effect.

According to the present invention the magnet is stabilized after knockdown by a high temperature treatment incomparably more severe than any temperature treatment given to magnets heretofore. The details of this treatment are given below but it is first desired to explain another factor that seems to be important and is partially determinative of the choices of baking procedures now preferred.

Stabilization of clamp

It will be observed from Fig. 1 that the armature blocks 19 are spaced from the poles of the magnet 17 by the side portions of the clamp or auxiliary frame 16. It is obvious that any change in length of these side portions will change the length of the gap through which the disc rotates. This clamp is preferably made of cast aluminum, and it has been determined that this cast aluminum lengthens approximately .0008 inch per inch with aging. Although it is evident that the change in the gap length from this source will be extremely small, yet the accuracy of the meter is extremely sensitive to such changes. It is therefore desirable to heat-treat the clamp in such a way as to age it completely before the meter is calibrated. A heat-treatment of the clamp at a temperature within the range of 300° F. to 600° F. greatly hastens the stabilization. At 450° F., two or three hours is probably enough for this purpose. However no harm is done to the clamp to hold it at 450° F. indefinitely.

Although wide variations in the composition of the aluminum clamp or frame are possible, two typical compositions may be given as follows:

|  | No. 1 | No. 2 |
| --- | --- | --- |
|  | Per cent | Per cent |
| Aluminum | 90 | 91 |
| Silicon | 8 | 5 |
| Copper | 2 | 4 |

It is also desirable that the entire cast aluminum frame 12 and the bracket 51 be stabilized as by heating for a few hours at 450° F. Without such stabilization the aging of these parts might change the centering of the disc in the gap or it might change the distance of the magnet from the axis of the disc. The retarding effect of a damping unit increases as it recedes from the axis.

Finality of magnet stabilization

After a magnet has been stabilized, it is very desirable that there be no major changes in its magnetic state. A new alternating current knockdown, at least if greater than the original knockdown, would completely destroy the stabilization. To a lesser degree the stabilization would apparently be at least partially destroyed if the magnetic circuit were greatly changed as by removing the armature or putting one on that had not been there during stabilization. For this reason it is very desirable to stabilize the magnet with its armature in place. Of course, it would be somewhat difficult or inconvenient to use a temporary armature and substitute the final armature for it, and, accordingly, the most convenient way of avoiding any major change after stabilization is to assemble the magnet and its armature on the clamp or auxiliary frame with which they are to be used so that neither need be moved with respect to the other after stabilization. Of course, it will usually be necessary to adjust the screw 22, but movement of the plug 21 within the normal range of movement apparently is not enough to affect the stabilization. This latter fact has been found to be true by extensive tests.

Heat-treatment

In treating either the magnet unit or the magnet alone, a wide range of temperatures and times is permissible. Tests have indicated that baking at 212° F. could be sufficient, but it would be necessary to continue such baking for at least 400 hours even in the case of the occasional magnet units stabilizing in the fastest time. Surprisingly, the time required for various apparently identical magnets is quite different, and some magnets would require as high as 3500 hours at this temperature. In the more practical range it has been found that baking at 300° F. for 24 hours produces a magnet which is at least approximately stabilized so that the average variation, if any, in the temperatures encountered by meters will be very small. A baking time as long as 24 hours is practical but relatively undesirable commercially. I have discovered that a temperature at least as high as 475° F. is perfectly safe both for the magnet and for the assembled unit (if special precautions are taken as described below), and that, with a baking temperature of approximately 450° F., 8 hours is an adequate length of time for obtaining stabilization. Any further aging at temperatures encountered by meters (up to 180° F.) will have substantially no permanent effect. As a matter of fact, even temperatures much higher than this, and all the way up to 450° F., will have very little, if any, effect. Apparently 8 hours at 450° F. is not only enough to prevent any ordinary temperature magnetic weakening at temperatures below 450° F., but it is also enough to compeltely remove the Class IV effect, the removal of which at ordinary meter temperatures would take months or even years.

If for any reason it should be desired to stabilize the magnets alone without the frame, a considerably higher temperature will be safe. At a temperature of 650° F. the heating time could be very much shorter than the 8 hours required at 450° F. The 450° F., however, is preferred at present.

The exact temperature range permissible with 8 hours of baking has not been exactly determined. It is of course very difficult to determine because of the difficulty of the tests involved and because of the lack of uniformity in testing time required. One hundred magnets might show that 8 hours at 400° F. was sufficient, and then it might prove insufficient for the one hundred and first magnet. However, enough tests have been carried out to lead to the conclusion that 425° F. for 8 hours is safe. Thus, commercial attempts to maintain 450° F. have considerable leeway.

Direct current knockdown

As has previously been stated, I have discovered that the changes due to the Class IV effect have some connection with the alternating current knockdown. Furthermore, I have developed a method of reducing or avoiding the necessity for the heat-treatment by departing from the conventional practice with respect to the alternating current knockdown. According to this aspect of my invention the conventional alternating current knockdown is replaced by a direct current knockdown with a direct current producing a coercive force opposite in polarity to the magnetizing force and of a strength equivalent to the maximum coercive strength of the alternating knockdown heretofore used for the same magnets. As a result of this the effect of the normalizing lag is reversed. Instead of becoming weaker with the passage of time, the magnets become stronger. Furthermore, the total stabilization change is considerably less on the average than with magnets which have been subjected to the conventional alternating current knockdown. The result is that if baking should be undesired for any reason, reasonably satisfactory results could be obtained by using a direct current knockdown instead of an alternating current knockdown. It is possible that further tests will show that this method would be entirely satisfactory instead of reasonably satisfactory. The present tests indicate that this method of treatment would at least produce better magnets and meters with better long range accuracy than have been produced prior to the present invention.

In the hands of ultimate users of meters a slight tendency for the magnets to strengthen over a period of time (making the meters slower) is preferable to having them weaken (making the meters read high). From the standpoint of the power selling organization, the same thing is true to avoid complaints as a result of meters being found fast on tests.

By some controlled knockdown procedure such as subjecting the magnets with the direct current knockdown to relatively small alternating current demagnetizing forces (as compared with the initial direct current force) or by subjecting them to rapping or mechanical vibration it may be possible to reduce to a considerable extent the Class IV change even though, being in the strengthening direction, it is not extremely objectionable.

In this event a relatively quick and mild heat-treatment could be given to remove the likelihood of Class III weakening, so that the stabilization error will be reduced to zero more dependably than by any other method except the thorough stabilizing baking which is at present preferred because of the dependable completeness with which it stabilizes the magnets.

Separate baking

Because of considerations outside of the stabilizing procedure alone, it may be desirable at times to use an alternate method or procedure, which is to bake the magnet and the clamp separately. If this is done, the armature block parts and full load adjustment screw need not be baked with the clamp and, after the clamps alone are baked, the armature parts can be assembled to them and the assembly painted with an enamel which might otherwise be affected adversely by the heat of the bake. If the clamps are baked separately, they may still be given the same temperature and time as specified for the complete assembly.

Before the magnets are separately baked, they should receive the correct amount of alternating current knockdown to bring them to a strength which will be the final one required when assembled in a clamp with the contemplated final length of gap.

The magnets may in this case be baked at 450° F. for 8 hours, or, if convenient, even approximately 600° F. for say only one hour. After baking, the magnets may be assembled in the clamps with the final length of gap in the usual manner.

With this procedure tests have indicated that, on the average, Class IV changes will be in the direction of a small flux increase if the magnets are baked without any armature at all. One series of tests has indicated that if baked with a temporary armature next the magnets spaced at a distance such as to closely approximate the final length of gap in the completed assembly, the Class IV changes on the average will be very slightly in the direction of a flux decrease. By more accurately reproducing final armature conditions or, if necessary, by the choice of a gap length during the baking process that is slightly greater than the final gap in the assembled unit, practically zero Class IV changes can be secured as far as average values for a group of magnets are concerned. Perhaps the only handicap of this alternate method of procedure over the preferred method of baking the clamp and the magnet together is that the individual magnet units may tend to be a little more scattered in the magnitude of the values of their Class IV effect, even when the average for a large group of magnets is zero. This might result from the fact that the temporary baking armature must be removed in order to assemble the magnet into its final position on the clamp, but tests seem to show that this does not have very much of an adverse effect if any.

Again it is noted that the joint baking is at present preferred because of the absolute certainty, dependability and uniformity of the stabilization.

Non-magnetic heat effects

450° F. is a severe temperature at which to bake such parts as the spring 32 and the oil with which it is customary to lubricate the screw 22. As a matter of fact, many people would have assumed that for this reason it would be out of the question to bake the assembled unit at such a temperature. However, both of these difficulties have been overcome.

The spring 32 should be made of a metal which is able to withstand the 450° F. or even 475° F. without deleterious effects. K-Monel spring steel has been chosen for this purpose.

By lubricating the screw 32 with 600-W steam cylinder oil it has been found that a small residue from the oil will remain after the bake which will be sufficient for the purpose.

Since it has not been found practical to retain any temper in the sleeve 33, a split sleeve is not used when this heat-treatment is to be given to the unit. Instead, the sleeve is extended through the plug 21 and peened over at the end into notches in the plug so as to be tight in the plug and it is threaded over a substantial length with threads closely fitting the threads of the screw to eliminate play.

It may be noted, incidentally, that not all magnet materials will stand the severe baking without severe reduction or complete loss of their magnetic strength. It is believed, however, that any of the metals known as Alnico are capable of withstanding this heat-treatment and, furthermore, that they all need a severe heat-treatment of this nature in order to stabilize them.

The various Alnico metals are standard products obtainable on the market, but for completeness of information it is noted that the tests referred to herein and the commercial use of this invention have used the standard or "blue" Alnico, the complete composition of which is: nickel 20%, aluminum 12%, cobalt 5%, and iron 63%. It may also be helpful to give the following data on the various Alnico metals.

*Grades of Alnico*

| Trade code designation | Per cent cobalt content | Coercive force (Hc) | Residual flux (Br) |
|---|---|---|---|
| Blue (standard) | 5 | 470 | 7,050 |
| Red (copper Alnico) | 13 | 560 | 7,200 |
| Black | 5 | 605 | 6,000 |
| Green | 0 | 490 | 6,550 |
| Yellow | 9 | 530 | 7,100 |

Although the formula of each of the foregoing is a matter of public knowledge, it may be a convenience to include the following formula table here, the figures of course being percentages by weight.

| | Blue | Red | Black | Green | Yellow |
|---|---|---|---|---|---|
| Al | 13.0 | 10.5 | 13.5 | 13.5 | 12.5 |
| Ni | 21.0 | 17.5 | 27.0 | 26.0 | 21.0 |
| Co | 5.0 | 12.5 | 5.0 | 0 | 9.5 |
| Cu | 0 | 6.0 | 0 | 0 | 4.0 |
| Fe | Bal. | Bal. | Bal. | Bal. | Bal. |

From the foregoing it is seen that a meter is provided which has a permanence of accuracy heretofore unheard of. Its damping unit is not only resistant to weakening by stray fields but it is also stabilized as to temperature and time so that the temperatures to which meters are subjected will not weaken its magnet or elongate or displace the gap. This is accomplished by a heat-treatment incomparably more severe than heat-treatments heretofore provided and which is capable of removing the Class IV errors; and yet the damping unit is so designed that this severe heat-treatment does not adversely affect it.

I claim:

1. The method of rendering watt-hour meters, including a damping magnet system having a magnet, an armature and a non-magnetic bracket spacing the two to form a gap, immune to temperature cycles, which consist in baking the entire damping magnet system at a temperature of approximately at least 450° F. for approximately at least eight hours.

2. The method of providing temperature permanency in a magnet system, including a high coercive magnet, a separate magnetic member forming a gap therewith, and a non-magnetic support member spacing the other two members apart, which includes assembling the magnet system and magnetizing the magnet and thereafter heat-treating the magnet system to a temperature approximately at least as high as 450° F. and maintaining such temperature for a sufficient time to render the magnet substantially immune to temperature cycles at temperatures approximately at least as high as 180° F.

3. A magnet system including a permanent magnet, a non-magnetic member secured thereto, and a magnetic member secured to the non-magnetic member in such a position that it forms a narrow gap with the pole of the permanent magnet and forms part of the principal magnetic circuit of said magnet, said magnet system being temperature-aged to such extent as to be substantially immune to effects of temperature cycles at all temperatures below a temperature approximately at least as high as 180° F.

4. The method of stabilizing a magnet, which includes giving the magnet a baking treatment equivalent, as to temperatures below 180° F., to baking the magnet at approximately 300° F. for 24 hours.

5. The method of stabilizing a magnet, which includes giving the magnet a baking treatment equivalent, as to temperatures below 180° F., to baking the magnet at approximately 450° F. for 8 hours.

6. The method of stabilizing magnet units, including a magnet, a non-magnetic support member, and a separate magnetic member forming a gap with the magnet and spaced therefrom by the support member, which includes baking the unit for a time and at a temperature equivalent to baking the unit at approximately 300° F. for 24 hours.

7. The method of stabilizing magnet units, including a magnet, a non-magnetic support member, and a separate magnetic member forming a gap with the magnet and spaced therefrom by the support member, which includes baking the unit for a time and at a temperature equivalent to baking the unit at approximately 450° F. for 8 hours.

8. As an article of manufacture, a nickel-steel braking magnet unit for watt-hour meters and the like characterized by having sustained permanency under the influence of time and service temperature variations resulting from its having been subjected during manufacture to an A. C. knockdown, followed by an aging or stabilizing bake in the range between 300° F. and 650° F. for approximately 24 hours.

9. As an article of manufacture, a nickel-steel braking magnet unit for watt-hour meters and the like characterized by having sustained permanency under the influence of time and service temperature variations resulting from its having been subjected during manufacture to an A. C. knockdown, followed by an aging or stabilizing bake in the range above 400° F., but below a value which will substantially demagnetize the magnet, for approximately 8 hours.

10. As an article of manufacture, a nickel-steel braking magnet unit for watt-hour meters and the like characterized by having sustained permanency under the influence of time and service temperature variations resulting from its having been subjected during manufacture to a knockdown followed by a bake above 300° F., but below a value which will substantially demagnetize the magnet, with an air gap length during the baking greater than the final air gap length in service for a sufficient time to reduce the flux value at least as low as the value to which the flux will become stabilized with a gap of said final length.

11. As an article of manufacture, a nickel-steel braking magnet unit for watt-hour meters and the like characterized by having sustained permanency under the influence of time and service temperature variations resulting from its having been subjected during manufacture to an A. C. knockdown followed by a bake above 300° F., but below a value which will substantially demagnetize the magnet, with an air gap length during the baking greater than the final air gap length in service for a sufficient time to reduce the flux value at least as low as the value to which the flux will become stabilized with a gap of said final length.

12. The method of producing a permanent magnet which will not weaken with the passage of time when used in service with a given air gap length for which it is designed, which consists in magnetizing a magnet applying an A. C. knockdown force to it, thereafter baking it above 300° F., but below a value which will substantially demagnetize the magnet, with an air gap length during baking greater than said given air gap length for a sufficient time to reduce the flux value at least as low as the value at which it would ultimately become stabilized with a gap of said given length, and thereafter shortening the air gap length of said magnet to said given length.

STANLEY S. GREEN.